(12) United States Patent
Davies et al.

(10) Patent No.: US 10,854,058 B2
(45) Date of Patent: Dec. 1, 2020

(54) EMERGENCY ALERT SYSTEM

(71) Applicant: Overview Technologies, Inc., Encino, CA (US)

(72) Inventors: Christopher Paul Davies, Perth (AU); Scott Anthony Rhodes, Perth (AU)

(73) Assignee: Overview Technologies, Inc., Encino, CA (US)

( * ) Notice: Subject to any disclaimer, the term of this patent is extended or adjusted under 35 U.S.C. 154(b) by 107 days.

(21) Appl. No.: 15/553,421

(22) PCT Filed: Jan. 14, 2016

(86) PCT No.: PCT/US2016/013415
§ 371 (c)(1),
(2) Date: Aug. 24, 2017

(87) PCT Pub. No.: WO2016/137596
PCT Pub. Date: Sep. 1, 2016

(65) Prior Publication Data
US 2018/0075720 A1    Mar. 15, 2018

Related U.S. Application Data

(60) Provisional application No. 62/120,292, filed on Feb. 24, 2015.

(30) Foreign Application Priority Data

Jul. 14, 2015   (WO) ................ PCT/US2015/040421

(51) Int. Cl.
*G08B 13/196* (2006.01)
*H04W 4/90* (2018.01)
(Continued)

(52) U.S. Cl.
CPC ..... *G08B 13/19669* (2013.01); *G08B 13/196* (2013.01); *G08B 13/1963* (2013.01);
(Continued)

(58) Field of Classification Search
CPC ........ G08B 13/19669; G08B 13/19656; G08B 25/016; G08B 13/1963; G08B 13/19671;
(Continued)

(56) References Cited

U.S. PATENT DOCUMENTS

| 2014/0167955 A1* | 6/2014 | Mahajan | G08B 21/0269 340/539.12 |
| 2014/0364081 A1* | 12/2014 | Rauner | H04L 12/1895 455/404.2 |
| 2014/0368601 A1* | 12/2014 | deCharms | H04W 4/021 348/14.02 |

* cited by examiner

*Primary Examiner* — Jared Walker
(74) *Attorney, Agent, or Firm* — Avyno Law P.C.

(57) ABSTRACT

The present invention relates to an emergency alert system that triggers a distress event that is automatically managed by a community security system. The emergency alert system is activated through users' mobile devices and initiates communication with the community security system. Management by the community security system includes receiving the GPS location of the mobile device, recording a continuous stream of audio and video from the panic user's mobile application, notifying potential responders or groups of responders in the vicinity of the panic alert and, among other things, activating localized visual and audible deterrents present in surrounding private security systems, intelligently directing community CCTV cameras to record the distress event and issuing notifications to the closest community members for immediate responses, as well as other responders or group notification members.

13 Claims, 9 Drawing Sheets

(51) Int. Cl.
  *G08B 27/00* (2006.01)
  *H04N 5/232* (2006.01)
  *H04N 5/247* (2006.01)
  *H04L 29/08* (2006.01)
  *G08B 25/01* (2006.01)
  *H04N 5/76* (2006.01)

(52) U.S. Cl.
  CPC . *G08B 13/19656* (2013.01); *G08B 13/19671* (2013.01); *G08B 25/016* (2013.01); *G08B 27/00* (2013.01); *H04L 67/12* (2013.01); *H04L 67/125* (2013.01); *H04L 67/22* (2013.01); *H04L 67/2804* (2013.01); *H04N 5/23296* (2013.01); *H04N 5/247* (2013.01); *H04N 5/76* (2013.01); *H04W 4/90* (2018.02)

(58) Field of Classification Search
  CPC .. G08B 13/196; G08B 27/00; H04N 5/23296; H04N 5/247; H04N 5/76; H04L 67/12; H04L 67/125; H04L 67/22; H04L 67/2804; H04W 4/90
  See application file for complete search history.

EMERGENCY ALERT SYSTEM

CROSS-REFERENCE TO RELATED APPLICATIONS

This application is a continuation-in-part of International Application PCT/US15/40421, filed on Jul. 14, 2015, titled COMMUNITY SECURITY SYSTEM USING INTELLIGENT INFORMATION SHARING, which claims priority of U.S. Provisional Patent Application Ser. No. 62/120,292, filed on Feb. 24, 2015, titled COMMUNITY SECURITY SYSTEM USING INTELLIGENT INFORMATION SHARING and U.S. Provisional Patent Application Ser. No. 62/033,404, filed on Aug. 5, 2014, titled A SYSTEM TO DETECT AND DETER INTRUDERS WHEN THEY ENTER A PRIVATE AREA WITHIN A COMMUNITY, which applications are incorporated by reference in this application in their entirety.

RELATED APPLICATIONS

1. Field of the Invention

This application relates generally to a community-based security system having an emergency alert feature that enables individuals to utilize the resources of the community-based security system to notify others of distress, dangerous or potentially life threatening situations, to seek help and emergency assistance and to activate resources of the community-based security system to deter attackers and record events.

2. Background

When individuals find themselves in distress or emergency situations, the common reaction is to use a telephone to call the police or other emergency reporting services. For example, a person in need of emergency help may dial, or have another dial, the designated emergency reporting number, e.g., 911, to connect to an emergency service center. The service center then dispatches the proper emergency relief, based upon the reported emergency situation (e.g., police, fire fighter, paramedics, or a combination of the foregoing). Finding a telephone and dialing an emergency service number is not always an option.

More recently, speed dial numbers or panic buttons have been established, for example, on a user's cell phone, in vehicles or on wearable transmission devices, by programming a single key on the telephone or button to contact an emergency reporting service. In this manner, the user need not press individual digits on a phone dialing pad, but, instead, may need to press only a pre-marked speed dial key. These speed dial numbers and panic buttons are particularly useful when a user cannot easily access a phone or when a user cannot easily dial the emergency service number. Such panic buttons may transmit alarm signals to base units or receivers, or may contact a private company that provides dedicated support.

It is recognized that it is not always possible for individuals in emergency or life threatening situations to make telephone calls or trigger panic buttons. Efforts have been made to make triggering alerts easier, and in certain cases, automatic. Efforts have further been made to trigger certain local resources on personal devices, such as vehicles and/or cellular phones to help in distress situations.

For example, US 2015/0199895 automatically detects changed in acceleration of a mobile devices to detect, for example, a crash. When certain changes, above predetermined thresholds are detected, an alarm is activated to call for assistance. US 2013/0260825 teaches a covered panic button on the back of a user's cell phone that when activated, calls an emergency response service and triggers a siren to sound and lights to activate on the phone. This application also teaches the activation of cameras on the phone to record the event.

US2012/0302200 teaches a mobile application that can be programmed to take certain steps upon the activation of an alert on a mobile device. The application may be activated by a panic button or by shaking the mobile device. US2012/0225635 also teaches a portable device taking independent action to notify of an emergency situation when a shaking alert on a phone is activated. US2007/0218895 teaches the activation of a security period on a mobile device that if not terminated, can prompt notification to a security system.

To date, none of current art utilizes the resources of a community based security system to assist in emergency situations. Thus, a need still exists for personal emergency alert that can be managed by a community security system, and thereby, take advantage of the advanced resources that may be provided by such system in emergency situations.

SUMMARY

The present invention relates to an emergency alert system that triggers a distress event that is automatically managed by a community security system. The community security system ("CSS") of the present invention enables neighborhoods to construct a community curtain of security by individual members in a community installing private security systems, which form part of the overall system. GPS tagged monitoring and alert devices are installed around the perimeter of each individual's premises forming private security systems (PSS) that work cooperatively with each other. Each PSS may include sensory alerts (lights, sirens, etc.). Further, the CSS may include GPS tagged community cameras linked together to create an automated community CCTV network accessible by all the community group members.

In one example of an implementation, the private (PSS) or community security systems (CSS) may be in communication with the system users, via personal mobile devices, to provide real-time, alerts to the system users, community or group members. The security systems may further be in communication with, and managed by, a supervisory server for the community security system that is able to intelligently monitor all activities within the system and communicate, as necessary, to individual users and/or community or group members. Geo-coordinate references associated with each of the members of the community or individual private security areas as well as the location of the detection devices within the community and/or private security areas may be used to enhance the effectiveness of the system.

Optionally, the community system could group external cameras to create a community CCTV network accessible by all the community group members to provide access to live camera views, camera movement control and provide video history review to all of the community group members.

Each Personal Panic System is interactively linked to user's mobiles devices, which devices are used to manage and communicate with the PSS and CSS. As part of the mobile application that interacts with the PSS and CSS on the individual mobile devices, an emergency alert system or personal panic mode ("panic mode") can be initialized, which will trigger a distress event that is automatically managed by the CSS.

If the user feels threatened in any situation, for example, like he/she is being followed, is being physically threated or abused, is being abducted or is involved in or witness to any emergency situation, the user may activate the panic mode on his/her phone. Activation may occur by a number of different methods, including, but not limited to, shaking the phone or pressing a panic button. The mobile application that interacts with the PSS continually monitors the GPS location of the user's mobile device. When a user activates the panic mode, the GPS location of their phone is automatically transferred to a supervisory server managing the CSS. Activation of the panic mode may trigger the mobile device's audio and visual recording functions. The supervisory server may then receive and record a continuous stream of audio and video from the panic user's mobile application.

In response to the activation of a panic feature, the CSS can notify potential responders or groups of responders that are in the vicinity of the panic alert, that are needed to respond to the alert and/or are in part of a notification group established by the user issuing the alert. In a perceived panic situation, the closest CSS to the location of a distressed individual that triggered the panic function can activate, through PSSs surrounding the location, localized visual and audible deterrents, intelligently direct community CCTV cameras and issue notifications to the closest community members for immediate responses, as well as other responder or group notification members.

Other devices, apparatus, systems, methods, features and advantages of the invention will be or will become apparent to one skilled in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

As described below and in connection with FIGS. 1-9, the present invention relates to an emergency alert system that triggers a distress event that is automatically managed by a community security system. The emergency alert system can be triggered through a user's mobile device and, when triggered, initiates communication with a community security system that manages the emergency or panic situation.

Figure 1:
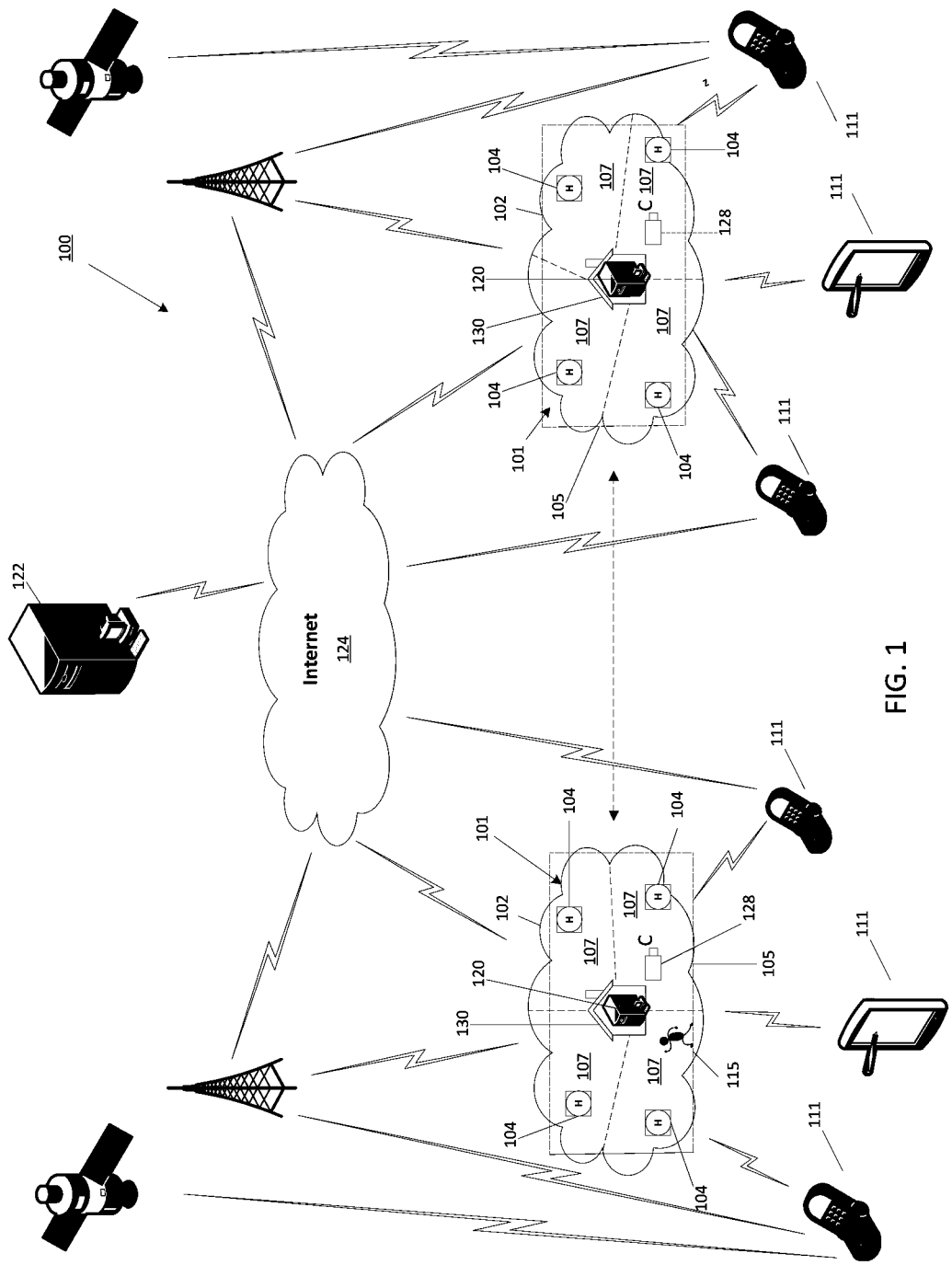
FIG. 1 illustrates a communication network for a community security system of the present invention.

FIG. 1 illustrates one example of a community security system 100 (also referred to as a "CSS") that may be used in connection with the present invention. The community security system 100 is capable of monitoring multiple, generally adjacent, consecutive private security areas 102 in a community to confirm human activity, engage sensory alerts 309, 310 (see FIG. 3) and determine the intelligent selection and/or automation of relevant equipment, such as a community CCTV camera 128. The community security system 100, as explained further below, can interact with a mobile application on user's mobile device, which mobile application may include an emergency alert system or panic feature that can be triggered by the user and managed by the community security system.

Each private security area 102 in the community is generally monitored by a private security system 101 (also referred to as a "PSS") that monitors the area external to a residential home or business 130 within certain predetermined perimeter boundaries 105. The private security systems 101 have the capability of being networked together to enable information sharing, thereby creating an intelligent community security system 100. FIG. 1 illustrates one example of a communications network for the intelligent community security system 100.

Each private security system 101 in the community includes detection devices 104 that use a detection field of view to detect humans 115 moving within various predefined horizontally and/or vertically spaced detection zones 107 within the private security area 102. These detection zones 107 may be established by the overlapping of fields of view or separately defined detection planes determined during the installation process. Each private security area 102 is divided into various detection zones 107 monitored by one or more separate detection device 104. As illustrated in FIG. 1, any detection information may be shared with adjacent or consecutive private security areas 102 through network communications via a master device 120 and shared supervisory server 122.

Figure 3:
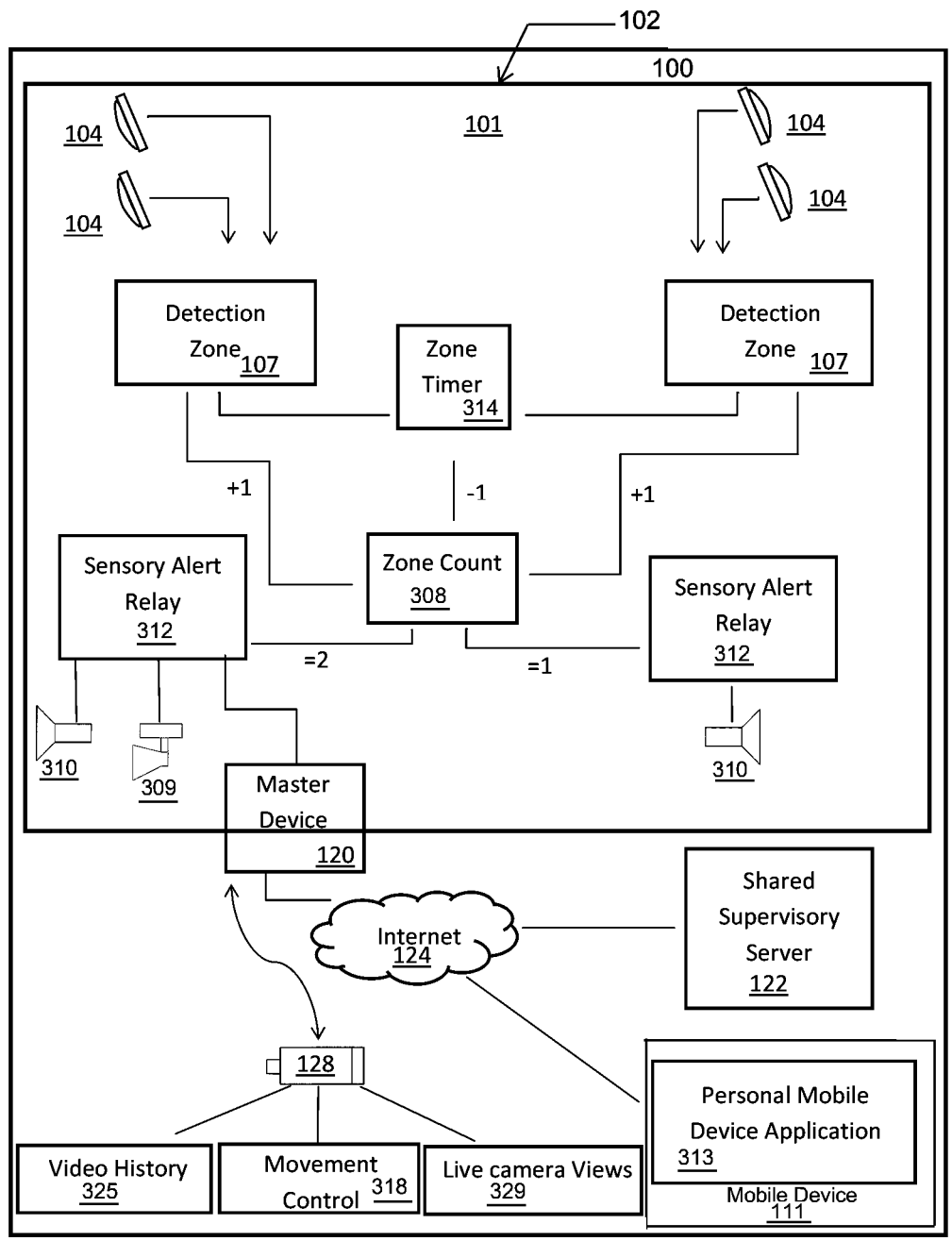
FIG. 3 is a block diagram of one example of an implementation of a private security system for monitoring a private security area in a community monitored as part of the community monitoring system of the present invention.

The detection devices 104 located within the private security areas 102 can communicate with other detection devices 104 in the private security area and with a master device 120 using a self-forming and propagating data communications network 401 (FIG. 4) formed between detection devices 104 and/or the master device 120 within the private security areas 102 and/or between adjacent or consecutive private security areas 102, using multiple redundant data pathways. The master device 120 could pass/act as a gateway to disperse this information via the Internet 124 to the shared supervisory server 122 for determination. As illustrated, the master device 120 can also communicate directly with user's mobile device 111 to disperse information to the users from the system and/or gather user information relevant to the operations of the system. For purposes of this application, a "mobile device" is any computing device that provides internet and/or cellular phone access, and may include, but not be limited to phones, tablet computers, wearable computers (e.g., glasses, watches, head-mounted displays), personal digital assistants, calculators, cameras, pagers, personal navigation devices, robots, game consoles, media player, mobile personal computers, etc. Applications running on mobile devices may be referred to as personal mobile device applications 313 (FIG. 3).

In operation, information gathered by individual detection devices 104 can be shared across multiple security areas 102 within the community security system 100 to confirm human activity and engage sensory alerts 309, 310. This gathered and shared information allows for human activity to be monitored throughout a community and across adjacent private security areas 102. Real world geo-coordinate equipment tagging, real-time GPS co-ordinate referencing of personal mobile devices 111 and real-time data analysis may be used to manage the relevant community members for response and assess risk to individual properties or private security areas 102 within the community security system 100.

Geo-coordinate equipment tagging and pre-determined detection zones 107 can be attached to detection devices 104 within a community security system 100 during installation, which can be used to manage the relevant sharing of information throughout the community security system 100. Real-time GPS co-ordinate application 313 (FIG. 3) for personal mobile devices for individual users/community members may also be used to facilitate relevant notification of alarm detections (i.e., determine notification response times) and control other events, such as determining the intelligent selection and/or automation of relevant equipment and/or the arming and disarming of private security systems 101. Additionally, real-time GPS co-ordinates for personal mobile devices 111 can be obtained and used to respond to personal panic/distress calls by community members, which could also enable nearby private security systems 101 to activate sensory alerts 309, 310 and notify other nearby community security systems 100 of distress or alarm situations.

The private security systems 101 can be programed to enable the self-learning of general patterns that could, for example, enable automatic arming and disarming of the private security system 101 to occur automatically or notify users of variations within the general patterns when they occur to enable manual intervention.

The community security system 100 could include a community CCTV camera system by grouping external cameras 128 located on private security areas 102 or public community areas into a single camera network accessible by all of the community group members. The community CCTV network could then provide access to live camera views 329, camera movement control 318 and store and provide video history 325 review to all of the community security system 100 group members. (FIG. 3)

The various system particulars of the community security system 100 and the private security system 101 generally described above are described in further detail below in connection with the respective figures.

A. Physical System Overview

In general, the community security system 100 used in connection with the present invention is comprised of one or more private security areas 102 monitored and protected by individually networked private security systems 101. A private security system 101 monitoring a private security area 102 can be a stand-alone system; however, the usefulness and functionality of the private security system 101, as explained below, can be greatly enhanced when single private security systems 101 monitoring private security areas 102 within a community are networked to create an intelligent community security system 100.

While not exclusive, the CSS 100 can relate to the monitoring, detection and notification of security breaches employed in single private security systems 101 in private security areas 102, which can form the basis for a larger community security system 100. The employment of one example of a single private security system 101 in a private security area 102 is described below.

Figure 2:
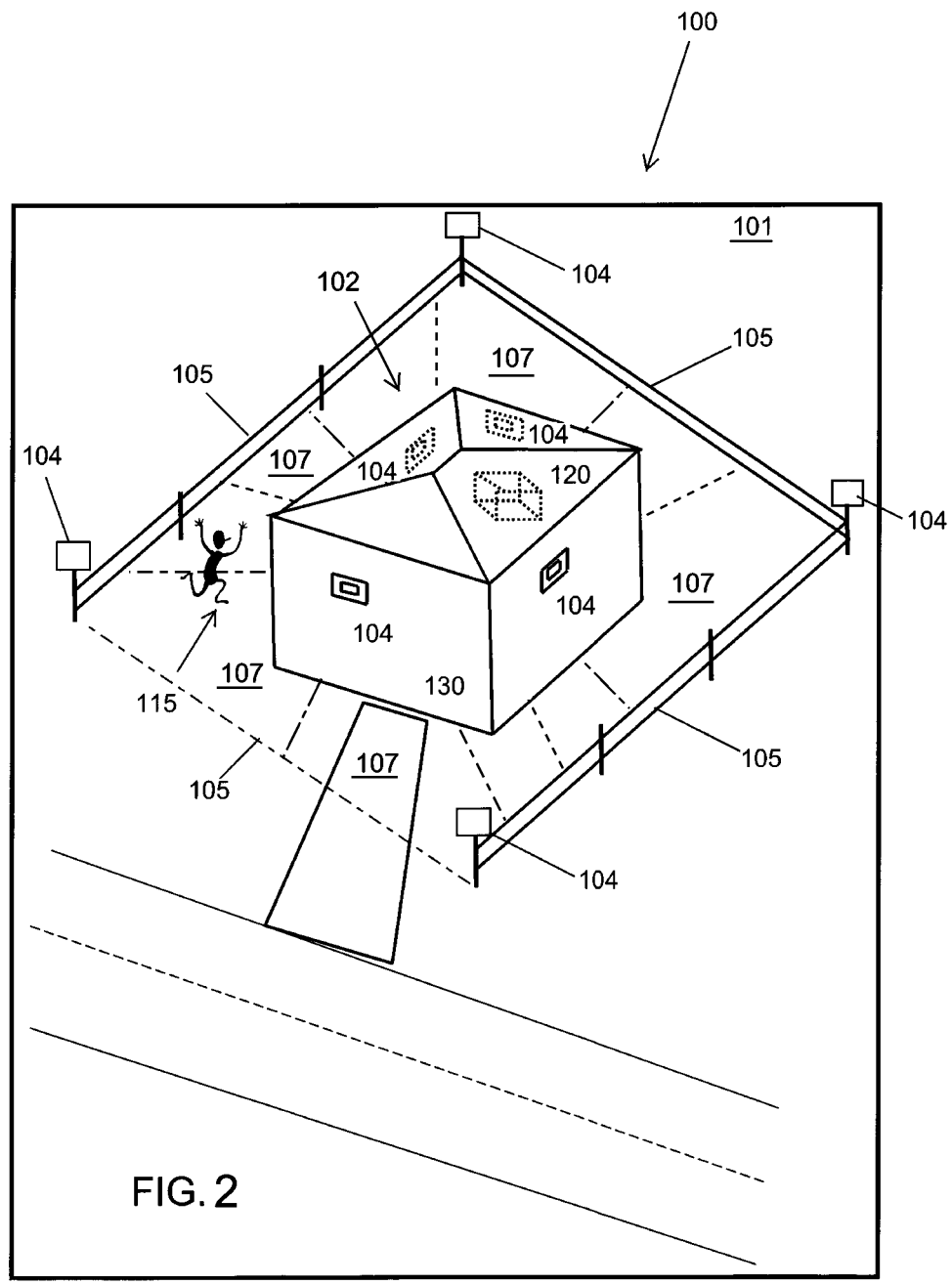
FIG. 2 plan view of a private security area forming part of the community security system of the present invention.

FIG. 2 illustrates a plan view of the private security area 102 of FIG. 1 that may be monitored by a private security system 101 of the present invention to notify the owners of the private security system 101 of the presence of intruders 115. The private security area 102 to be monitored is defined, generally, by the property lines or by a specified area within the property lines or extending around any protected area or structure 130. The monitored area defined by established perimeter boundaries 105 may be deemed a restricted area. In sum, the private security area 102 can be defined by the area that the private security system 101 owner requires monitoring by designating perimeter boundaries 105, which may surround, for example, a physical structure 130.

The private security system 101 used within each private security area 102, such as the area surrounding a home, may include one or more detection devices 104 installed around the outside walls of the physically secured building 130 and/or about the perimeter of the private security area 102. One or more detection devices 104 may be housed within the same housing. Detection devices 104 may include, but not be limited to, any of the following devices capable of monitoring movement, or assisting with, monitoring or detecting activity in a given area: security cameras, lights, motion sensors, beam sensors, door sensors, and/or other motion detectors, including but not limited to a passive infrared (PIR) detectors.

Two detection devices 104 may monitor the same area from different horizontally and/or vertically space separated perspectives. These detection zones 107 may be determined by the complete or partial overlapping of fields of view or space separated detection planes ascertained during the installation process or as a function of the physical construction of the housing containing multiple detection devices 104. When each detection zone 107 is monitored by at least two detection devices 104, the chances of false intruder 115 detection are greatly reduced. In this manner, detection devices 104 may be installed to form multiple detection zones 107 (first, second, third . . . detection zones) within a private security area 102, which may be around the outside of a secured building 130. The number of detection zones 107 in a given area may depend upon the size and shape of the private security area 102 being monitored.

Figure 4:
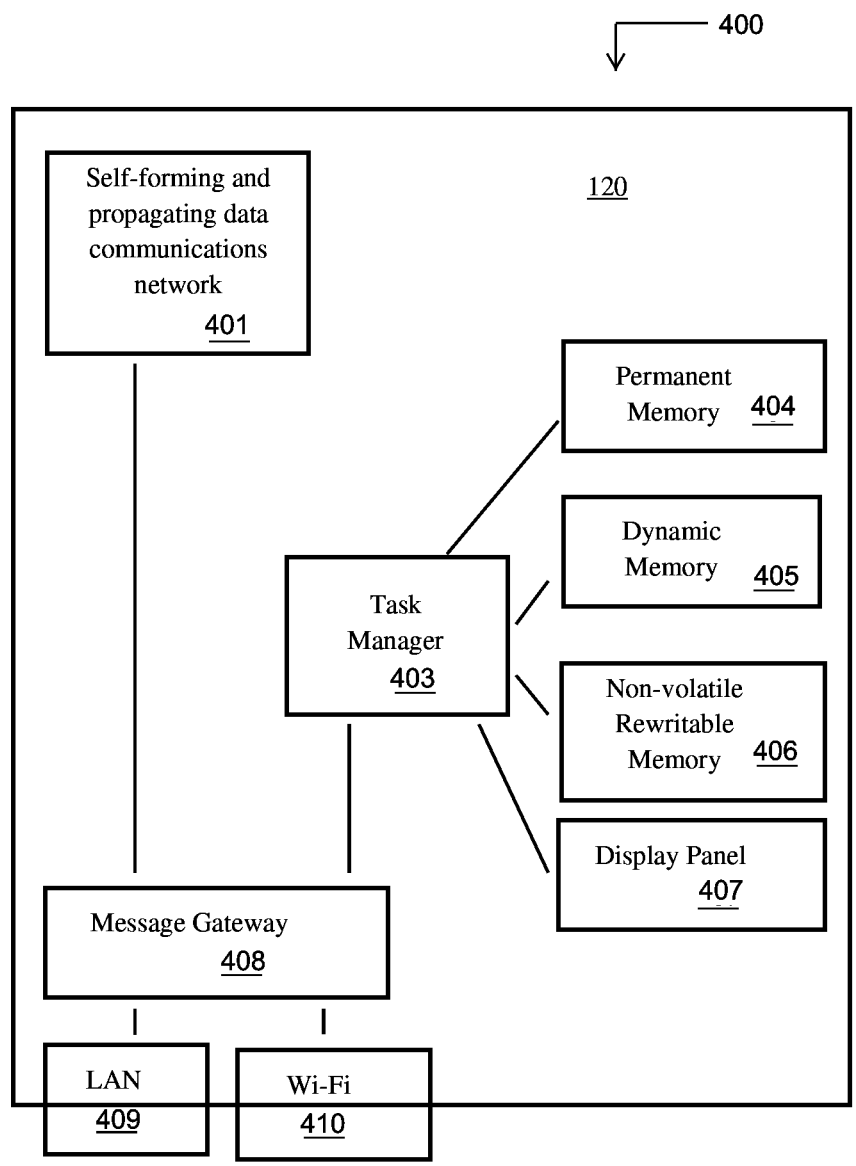
FIG. 4 depicts a block diagram of a master device of the private security system of FIG. 3.

The detection devices 104 may communicate with each other and/or the master device 120 using a self-forming and propagating data communications network 401 (See FIG. 4). This communications network 401 could be formed, for example, using a proprietary packet data radio transmission system. The detection devices 104 may be professionally installed or installed as a "Do-It-Yourself" system. The private security system 101 may be wired, wireless or both and powered through the grid or independently powered by battery or renewable energy, such as solar energy, or both.

A private security system 101 may also include or share a master device 120, which can be located within the physically secured building 130, an adjacent building, or elsewhere within the community and powered from the grid. The master device 120 may contain its own battery backup to overcome short-term power outages. The master device 120 may also use a self-forming and propagating data communications network 401 to communicate with the detection devices 104. The master device 120 could pass/act as a gateway to disperse information via the Internet 124 to the shared supervisory server 122 for determination. The master device 120 may also dynamically take on some of the duties that would otherwise be performed by the shared supervisory server 122 for such reasons as loss of Internet connectivity or diversification of the workload and duties within the normal operation of the community security system 100. The master device 120 may also provide community connectivity to the Internet 124 using the cellphone network such as 3G/4G or other known physical Internet gateways etc., as illustrated in FIG. 1.

The master device 120 may communicate with a shared supervisory server 122 via the Internet 124 to exchange information, detection status and other functions etc. The master device 120 and/or the shared supervisory server 122 may communicate with a user's mobile device 111. Application(s) 313 residing on the personal mobile devices 111 may provide a user interface to the community security system 100.

In the case of the private security system 101 family group members are generally mobile, so their physical GPS coordinates may also be monitored by their personal mobile devices 111. As the mobile device 111 knows its proximity to the private security area 102 it can notify the shared supervisory server 122 of events such as leaving the private security area 102 or arriving at the private security area 102 to assist with arming/disarming determinations. Application 313 on the mobile devices 111 can also perform the task of filtering notifications from the shared supervisory server 122 based on real-time GPS co-ordinates of the user and or user status such as administrator, home group membership etc. The shared supervisory server 122 may interrogate the personal mobile device 111 to determine the whereabouts of each member's personal mobile device 111. The shared supervisory server 122 could intelligently select which of any group members of a community or private security system will be contacted based on their physical location at the time of an intruder 115 detection. Either or both the shared supervisory server 122 or the master device 120 could also use the GPS co-ordinates of family members in the group for a variety of purposes, including arming and disarming of the system and intelligent learning of behavior patterns that could enhance or impact the performance of the private security system 101.

The private security system 101 could intelligently self-determine times of arming and disarming based on the comings and goings at the property, e.g., children arriving home from school. When a member's mobile device 111 GPS co-ordinates enters the vicinity of the private security area 102, the security at the front of the house may be disarmed for a set period. In this example, after the child enters the house, the private security system 101 could rearm and optionally notify the parent through their personal mobile device application 313 that the child is home. This determination or functionality could also be made by the shared supervisory server 122.

Turning now to FIG. 3, FIG. 3 depicts a diagram of one example of an implementation of a private security system 101 of the present invention in a private security area 102. As illustrated, the private security system 101 may include a number of different detection devices 104, including, but not being limited to, any of the following devices capable of monitoring movement, or assisting with, monitoring or detecting activity in a given area: security cameras, lights, motion sensors, beam sensors, door sensors, and/or other motion detectors, including, but not limited to, a passive infrared (PIR) detectors. Those skilled in the art will recognize that any number of different detection devices, used alone or in combination, may be used in connection with the present system 100. As one or more detection devices 104 may be housed within the same housing, detection devices 104 may operate in a stand-alone manner to monitor a detection zone 107. However, it is envisaged that two detection devices 104 would monitor the same detection zone 107 from different horizontally and/or vertically space separated perspectives. These detection zones 107 may be determined by the overlapping of fields of view or space separated detection planes ascertained during the installation process. As noted above, when each detection zone 107 is monitored by at least two detection devices 104, the chances of false intruder 115 detection are reduced.

The private security system 101 also includes a zone timer 314 and zone counter 308 in communication with sensory alert relays 312 used to trigger sensory alerts 309 and 310, such as lights or sirens. As explained further below, the zone timer 314, zone counter 308 are used to determine when to trigger the sensory alerts 309 and 310 via the sensory alert relay 312. The private security system 101 includes a master device 120 for communication with the detection devices 104.

As illustrated in FIG. 4, which is an example block diagram of the master device 120, the master device 120 may include a self-forming and propagating data communications network 401, a task manager or controller 403, permanent, dynamic and non-volatile memory 404, 405, 406 and 407, as well as display panel 407, message gateway 408 and LAN and/or WiFi connectivity 410. In this example, the detection devices 104 can communicate with each other and/or the master device 120 using the self-forming and propagating data communications network 401 to monitor, detect or help detect intruder 115 movement in the private security area 102.

Turning back to FIG. 3, the master device 120 may communicate with multiple types of detection devices 104 using the self-forming and propagating data communications network 401 and pass/act as a gateway to disperse this collected data to the shared supervisory server 122 via the Internet 124. The detection devices 104 could be detecting but the shared supervisory server 122 makes a determination as to whether or not these detections should be ignored, such as when the private security system 101 is in a disarmed state. Arming/Disarming of the private security system 101 may be accomplished via a user's/members personal mobile device application 313 either manually or by proximity using GPS co-ordinate references.

The shared supervisory server 122 may configure the community security system 100, aid in the monitoring of detection zones 107 and generate/receive notification from personal mobile device applications 313 that may be accessed via the Internet 124. The LAN 409/Wi-Fi router 410 may connect the private security system 101 with the Internet 124, while providing wireless internet capabilities to the private security area 102 and/or the community security system 100. Community CCTV cameras 128 may provide analog or digital video and this video may be formatted or reformatted into a common format for storage as video history 325. Movement control 318 and live camera views 329 may also be provided in connection with the CCTV cameras 128.

Detection devices 104, lights 310, and sirens 309 may be located outside of the building and cover the private security area 102. When an intruder 115 is detected in the private security area 102, the sensory alert relay 312 may be instructed to activate or otherwise turn on a light 310, siren 309, and/or other means of sensory alert to announce to the intruder that they have been detected in the private security area 102 prior to breaching the physically secured building 130 and/or other type of restricted zone. As such, the intruders' window of opportunity has already expired. Knowing this, the intruder 115 is more likely to leave the private area external to the physically secured building 130 and/or other type of restricted zone without perpetrating a criminal act minimizing the risk of financial loss/damage or a personal injury occurring due to a violent act.

In one example, during operation, a detection device 104 may detect an intruder 115 in the private security area 102 and signals the master device 120 using the self-forming and propagating data communications network 401 that there has been a detection. The master device 120 passes/acts as a gateway to disperse this information on to the shared supervisory server 122 via the Internet 124 for processing. If a second detection device 104 is triggered within the private security area 102 at the same time and location (which can be determined by the detection devices 104 geo-coordinate tagging), the shared supervisory server 122 determines the existence of a detection zone 107. A zone timer 314 is activated and a count of one is added to the zone count 308. The sensory alert relay 312 is then activated, turning on a strobe light 309. If a community CCTV camera 128 has been installed at a nearby location, determined by the camera's 128 own GPS co-ordinate, the shared supervisory server 122 engages the camera's 128 movement controls 318 to position the camera 128 by calculating a vector direction and distance for that CCTV camera 128 to best observe the triggered detection zone 107. This instruction is sent via the Internet 124 and LAN 409/Wi-Fi router 410 so that the community CCTV camera 128 is positioned to best view the scene. The community CCTV camera 128 outputs live camera views 329 and saves video history for later review 325.

If there are no further triggers of an overlapping detection zone 107 within a given period, the zone timer 314 then resets and takes one away from the zone counter 308. The CCTV camera 128 is directed by the shared supervisory server 122 via the Internet 124 and LAN 309/Wi-Fi router 310 to return to its normal home position.

If a second detection zone 107 is determined before the zone timer 314 is reset, then the response is escalated. If available, the community CCTV camera 128 continues to monitor the scene outputting live camera views 329 and recording video history 325. The zone count 308 now equals two so the sensory alert relay 312 triggers all lights 310 and sirens 309 to activate within the bounds of the private security area 102. The shared supervisory server 122 determines that an intruder 115 has been confirmed and notification is sent to the closest responder and the system administrator through their personal mobile device application 313. The closest responder is determined by checking the GPS coordinates of each responder's personal mobile devices 111 or the individual personal mobile device application 313 determining whether this responder is close enough to respond. Responders may also be notified via email, text messaging, telephone, to provide a few, but not exhaustive, examples.

In the above example, those skilled in the art will recognize that the master device 120 may also dynamically take on some of the duties that would otherwise be performed by the shared supervisory server 122 for such reasons as loss of Internet connectivity or diversification of the workload and duties within the normal operation of the community security system 100. Throughout the applications, operations described as performed by the supervisory server 122 should not be so limited and may be performed by the master device 120.

Turning again to FIG. 4, the primary function of the master device 120 could be considered as a bi-directional data gateway between the self-forming and propagating data network 401 and the shared supervisory server 122. The master device 120 may include permanent memory 404 which is ROM or re-programmable and contains the firmware for the master device 120 functions, dynamic memory 405 such as RAM to store data values and instructions for use by and during the execution of the firmware and non-volatile rewriteable memory such as HDD or SSD 406 to hold information such as the customer record database, alarm status etc.

The master device 120 has the ability to facilitate detection device 104 communications between each other and the master device 120 using the self-forming and propagating data communications network 401. The communication route between each of the detection devices 104 and the master device 120 is dynamic. All detection devices 104 find a data route back to a master device 120. If the closest master device 120 is unavailable for any reason, such as a loss of power or failure, then the detection devices 104 will continue to pass messages via the self-forming and propagating data communications network 401 between each other until the route to another master device 120 is determined. This self-forming and propagating data communications network 401 uses a non-specific routing protocol which could be formed, for example, using a proprietary packet data radio transmission system.

The master device 120 includes a message gateway 408, which facilitates the passing of communications internally within the master device 120. The message gateway 408 may also pass/receive messages from the detection devices 104, lights 310 sirens 309 and/or other sensory alert means via the self-forming and propagating data communications network 401. The message gateway 408 may also pass messages externally via LAN 409 and/or Wi-Fi 410 over the Internet 124 to the shared supervisory server 122 (FIGS. 1 and 3) and/or individual users through their personal mobile devices 111 (FIGS. 1 and 3). The LAN 409 and/or Wi-Fi 410 modules may physically reside within or be external to the master device 120.

The master device 120 includes a task manager or controller 403, which may be responsible for the internal management of the master device 120. The task manager 403 may co-ordinate tasks such as the syncing of customer records with the shared supervisory server 122, managing firmware updates, and collecting alarm status if the shared supervisory server 122 is off-line due to for example, power or internet loss. The collected alarm records may be forwarded on to the shared supervisory server 122 once communication is re-established. A display panel 407 such as a touch display may be used with the master device 120 to provide a user interface to setup and configure the master device 120, the private security system 101 and or the community security system 100.

As noted above, the master device 120 may dynamically take on some of the duties that would otherwise be performed by the shared supervisory server 122 for such reasons as loss of internet connectivity or diversification of the workload and duties within the normal operation of the community security system 100.

Figure 5:
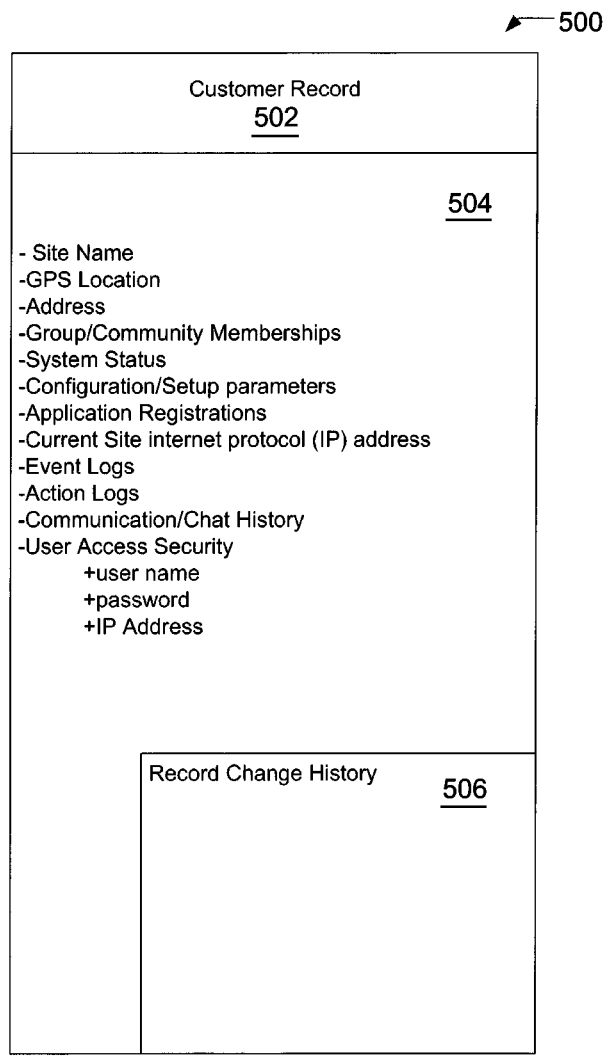
FIG. 5 illustrates an example customer record stored in the database of the shared supervisory server of the community monitoring system.

FIG. 5 is one example of a customer record that may be stored in the system database (not shown) of shared supervisory server 122. The customer record 502 may have text fields 504 for identification of site name, GPS location, address, group/community memberships, system status, configuration/setup parameters, application registrations, current site internet protocol (IP) address, event logs, action logs, communication/chat history, and user access security. The customer record 502 may also keep track of changes to the database record in a record change history filed 506. Additional or few fields may be used and are typically dependent upon implementation. The database may be implemented as a flat file, liked lists or other data structure, or a relational database such as SQL. The database record may be located at the shared supervisory server 122.

The private security system 101 may be designed to use very low power consumption (replaceable battery and/or solar or other renewable battery charging solutions) and be wirelessly installed as a 'Do-It-Yourself' security system using the two stage fixing system with the personal mobile device application 313 for installation guidance. The two stage fixing system would comprise an instant adhesive as a primary fixer such as double sided tape for positioning/locating detectors to a wall or fence making it possible for the secondary fixing system such as a durable liquid adhesive, screws, nails etc. to cure or be installed.

In operation, once an intruder 115 has been detected within a detection zone 107 the first detection device 104 could use its associated sensory alert means 309, 310 to act as a deterrent. When movement is detected in a second detection zone 107, the detection device 104 could send a data signal, using the self-forming and propagating data communications network 401, to all other detection devices 104 within the private security system 101 to operate their associated sensory alert means, including but not limited to, turning on strobe lights 310 or sirens 309, thus acting as an increased deterrent to the intruder.

The master device 120 has the ability to facilitate detection devices 104 to communicate with each other using the self-forming and propagating data communications network 401. This network uses a non-specific routing protocol, which could dynamically use one or more detection devices 104 to pass on a data signal to/from a specific detection device 104 back to the master device 120. The master device 120 also provides an internet 124 gateway for communication with the shared supervisory server 122 and individual users through their personal mobile device application 313 and/or other personal technologies 111.

The shared supervisory server 122 is located at a secure location away from the location of any private security system 101. The shared supervisory server 122 uses a communications means such as the internet 124 to provide communications with many individual private security systems 101. It could provide a web site or personal mobile device application 313 interface for the family group administrator to access information and status and control of their single system 101 via normal internet technologies.

The shared supervisory server 122 provides automated account management services for the family group administrators and community groups, and the linking/securing of the owner's/authorized person's mobile device 111 or other personal technologies to the owner's private security system 101 and community groups. The shared supervisory server 122 provides a secure portal for access to a community CCTV network.

The shared supervisory server 122 manages the database 500 which includes customer records 502 containing information 504 such as but not limited to: (i) site name; (ii) site geo-coordinate location; (iii) geo-coordinate location of all detection devices/master devices/community CCTV cameras etc.; (iv) address; (v) family group; (vi) group members current geo-coordinate locations; (vii) group/community memberships; (viii) system status; (ix) physical hardware configuration/setup; (x) application registrations; (xi) current site IP address; (xii) event log; (xiii) action log; (xiv) communications/chat history; (xv) panic logging, tracking, recording (xi) user access security/IP address and a record change history 506.

Several separate private security systems 101 installed for several individual owners could be considered as a group or community for the purpose of inter-system management, information/data exchange, notification and control by the owners/members within such a community. System membership to one group is not exclusive. One system can be a member of several groups concurrently, including but not limited to property boundary neighbors, local street, housing estate, church group, sports group, watch groups, employee groups.

Installing a private security system 101 in each home along a street or estate housing block would be considered a community security system 100 providing a curtain of security throughout the street or estate. Each home has an absolute geo co-ordinate location and each detection device 104 has an absolute geo co-ordinate location. The shared supervisory server 122 can intelligently determine when human detection from one detection device 104 at one private security area 102 needs to be shared with that of another private security area 102 (based on proximity). This has the effect of expanding a private security area's 102 security curtain beyond its private security area 102 boundary. Each community member is only installing a small part of the overall community security system 100.

At the time of a human detection, the off-site shared supervisory server 122 can intelligently select which of the group members will be contacted based on their physical location monitored by their personal mobile device application 313. The personal mobile device application 313 can also perform the task of filtering notifications from the shared supervisory server 122 based on real-time GPS co-ordinates of the user and or user status such as administrator, home group membership etc. At the time of a human detection, the shared supervisory server 122 may interrogate the personal mobile device application 313 to determine the whereabouts of each member's personal mobile devices 111. The shared supervisory server 122 could intelligently select which of the group members will be contacted based on their physical location at the time of an intruder 115 detection and or priority listing at the time of the human movement detection, e.g., family members, neighbors, other community group members, gate house, mobile security etc. for response.

Figure 6:
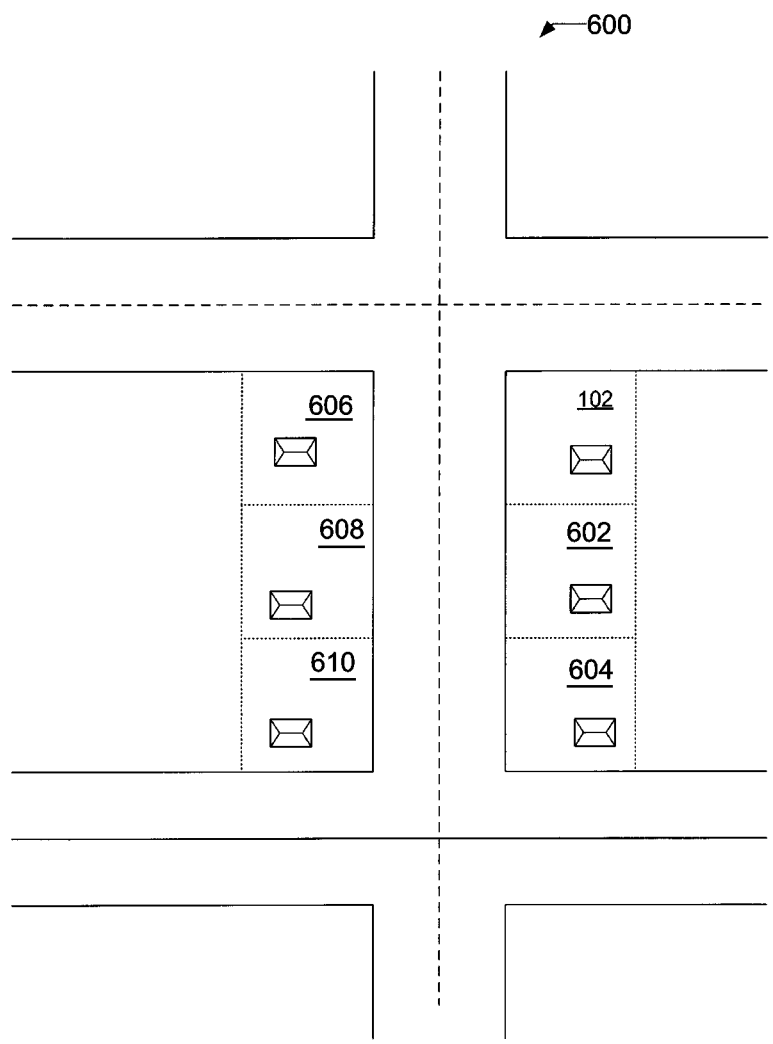
FIG. 6 illustrates a drawing of multiple private security areas forming a community security system.

FIG. 6 is a drawing 600 of private security areas 102 of FIGS. 1 and 2 and other private security areas 602-610 outside of structures are depicted. Each of the private areas 102 and 602-610 may have a private security system 101 that all communicate with a shared supervisory server 122 through a master device 120. When the private security system 101 detects an intruder 115 in the private security area 102 external to the physically secured building 130 and/or other type of restricted zone and notifies the owner/authorized person, an additional notification may be sent to other members in a group or community (such as home owners, family members or occupants of 602-610 of FIG. 6) that identifies the previous location and movements of the intruder 115. The notification may be as, but not limited to: text messages, sound prompts, voice messages, graphical descriptions and/or photos sent a user's personal mobile device 111, which may be accessible directly or via a personal mobile device application 313 interface on the users' mobile device 111.

Information provided may include, but not be limited to, identification of the property, time of intruders' movements, warnings, response and actions of other authorized users, communications/chat between authorized users. The notification to other groups or communities may be directed via the shared supervisory server 122.

By way of example, private security system 101 detects an intruder 115 in private security area 102 and notifies the owner/authorized user of the intruder 115. The private security system 101 may also notify the adjacent private security area 602 of an intruder 115 being detected via the shared supervisory server 122 internet 124 and/or self-forming and propagating data communications network 401. The private security system 101 associated with private area 602 may then go on a heightened status and actively attempt to detect an intruder 115. If a calculated directional heading and relative distance of the intruder 115 is ascertainable by the shared supervisory server 122, then more directed notices to other private security systems 101 and their home owners may occur.

The shared supervisory server 122 contains the customer record 502 related to each member and all installed hardware such as; detection devices 104 CCTV cameras 128 etc. within the community security system 100. The shared supervisory server 122 may use alarm events and other real-time event information such as; arming and disarming to conduct statistical analysis to create status reports for the purpose of further improving the overall community security. This information may be made available through the social media forum available to the community members. The shared supervisory server also facilitates access to the CCTV cameras 128, which creates the community CCTV system. Thus, event data, captured CCTV video history 325, live camera views 329 and detected intruder 115 information may be shared among multiple private security systems 101.

A website interface could integrate several third party services and technologies, including, but not limited to: a world mapping service to locate the owners property/restricted zone, obtain the geo-coordinates location of the property/restricted zone, facilitate site analysis and system design and estimation and quotation tool, goods sales/ordering and payment system, and create the customer record details on a shared supervisory server 122 to accept communications from the owner's new system, use the geo-coordinates location and social media sites such as but not limited to, Facebook and Twitter, to cross reference friend lists to analyze and recommend possible community groups to be joined, and have automated account management services for the owners and community groups, and the linking/securing of the owner's/authorized person's mobile devices 111 to the owner's system and community groups.

Although the main invention relates to human detection, it is envisioned that each private security area 102 owner within a community could install a self-powered/mains powered, wired/wireless CCTV camera 128. This camera 128 could include a recording means for gathering video history 325, a movement control means 318 (pan, tilt, zoom) and a remote review means to allow community group members to access the video history 325 and/or live camera views 329 of not just their own camera but other cameras within the community group. Each individuals/groups cost outlay is reduced but each group member has access to the larger community security system 100 network that is created. This CCTV camera network could be linked together through the LAN 409, Wi-Fi 410, and/or Internet 124 using the cellphone network such as 3G/4G or other internet gateways etc. The community CCTV camera network may be installed by a body corporate, home owners association, county, city, municipality, neighborhood, or individual members each installing one or more cameras 128 etc. for the benefit of all community members.

When installed, a physical geo-coordinate reference is associated with each camera 128 and is used to determine camera 128 selection by the members. This could be a map display of camera 128 locations or assist the member by recommending appropriate camera 128 selections for their current requirement. Footage from the camera 128 could be used by the gatehouse, security patrol, police authority etc. to aid in the identification/apprehension of an intruder 115.

Access to the CCTV camera video history 325 or live camera view 329, could be securely managed by the shared supervisory server 122 through a personal mobile device application 313, secure website, etc. The CCTV system is not used to do human 115 detection and as such, does not form a detection zone 107. It is purely used to provide live vision 329 and recorded video history 325 of general activity and/or automated detection events throughout the community.

As home owners are already members of community groups, it is envisaged that social media sharing of general information relating to individual security and community security could be contributed to and shared with other members of the community group. This information could consist of written texts, chat, photos, video, other media content etc. for the purpose of discussing, detailing, reducing and ultimately preventing criminal activity within the community.

Alarm status metrics etc. from community group member's private security systems 101 could be gathered individually or grouped for statistical analysis, presentation and review by the community group members. This could be presented as a simplistic level of probability of criminal activity. While this information is a valuable tool for this community group, it is also of value for law enforcement, aiding in the prevention of criminal activities within this community and adjacent communities.

It is intended that this social media service would be an integrated part of the website, personal mobile device application 313 and any related system application. The social media content related to community groups (as a system can be a member of more than one) is presented through the social media login page interface on the personal mobile device application 313. Each home owner's social media page would be locked to the unique identification number of the individual system and formatted based on its community group memberships, using chosen settings and preferences to filter the viewable content. The social media content uses privacy settings to allow group members to choose what is/is not publically viewable, preserving the group members' privacy.

During the setup phase, community group memberships may be selected. The personal mobile device application 313 interrogates the shared supervisory server 122 to determine or restrict groups using the geo-coordinates location, fee structure and/or social media sites such as but not limited to, Facebook and Twitter, to cross-reference friend lists. The arming/disarming regime may also be selected. Certain select pre-set features may also be modified during the set-up phase, as necessary or desired. Modifiable features may include, but not be limited to, the following: (i) engagement of audible or visual sensory alerts; (ii) notification priority for first and/or second movement detections (i.e., who receives the alert and who responds) and (iii) local requirement/restriction compliance features.

Groups may be formed, managed and notified based upon family members, mobile devices 111 associated with members of the household. Individuals added to a group may be provided with downloads of applications 313 for their personal mobile devices 111 to become group members and receive notifications. New members may be provided with a unique identification number to become members to a group. Membership can be formed and managed by an administrator, which permits group access and establishes members.

Groups can also be established based upon geography, which may be a community group or a sub-set of a community group created either by a predetermined radius around a customer's private security area 102 and/or other type of restricted zone or directly abutting neighbors. Groups could be formed based upon residences of communities, streets, official response group (gatehouse, community security, police etc.) or other defined groups, such as social groups, work colleagues and/or watch groups, to name a few.

C. System Arming/Disarming

Each private security system 101 can be manually armed and/or disarmed upon entry or exit using the personal mobile device application 313. Additionally, the private security system 101 may automatically arm or disarm itself based upon the learnt activities of group members. For example, when all of the members of a family group (personal mobile device 111 GPS geo-coordinates) leave the private area external to the physically secured building 130 and/or other type of restricted zone, the system could notify the administrator or last family group member to leave and recommend arming, if there is no response from the administrator or family group member then the private security system 101 could automatically arm itself. When a family group member (personal mobile device 111 GPS co-ordinates) returns, the private security system 101 could automatically disarm or recommend disarming.

Each personal mobile device application 313 within the family group may prompt its owner based on learned arming behavior. Should there be no response, then the system will automatically arm itself. Detection device 104 events may also assist in this process. If a family group member's personal mobile device 111 were in the private security area 102 external to the physically secured building 130 and/or other type of restricted zone, then the system would not automatically arm itself. The home group administrator has the ability to temporarily exclude a family group member's personal mobile device 111 in the event of this device 111 being misplaced or left at home. Other normal use information, including, but not limited to, environmental data and detection activity data can also be gathered to assist in the automatic management and control of the security system 101.

The security system 101 could learn the vulnerable periods and patterns of arming and disarming to automatically predict and manage the protection of the physically secured building 130 and/or other type of restricted zone. By regularly being armed and/or disarmed over an extended period of normal use, including but not limited to, a day, month or year, the system would be able to intelligently determine the vulnerable periods and patterns of arming and disarming. This would aid in the private security system 101 automatically predicting and managing the protection of the physically secured building 130 and/or other type of restricted zone by offering suggested arming and disarming times to the administrator and/or other family group member or applying such calculated suggestions automatically.

The security system 101 can learn disarming/rearming patterns from events, such as children arriving home from school or in the evening, when all family members have arrived home, the private security system 101 can rearm itself to protect the family during the hours of darkness.

D. System Management

The initial customer may be designated the system administrator. Should other family members download the personal mobile device application 313 and input the unique identification number of the family group, the administrator must authorize the joining of the group. If these new members of the group desire to become administrators, then the initial administrator is contacted and they must authorize this administrator privilege.

The system administrator may be given the ability to perform the following functions, among others: (i) change the membership within a group; (ii) change the notification order if human movement is detected (on holidays etc.); (iii) introduce a delay period when the system is armed; (iv) receive notification of low power/faulty detection devices 104; (v) control fee payment reminders (depending on the community fee structure); (vi) obtain history/statistic reports (human movement detected, system arming, system response); (vii) control automatic reporting/reordering of faulty equipment and delivery information of replacement equipment due to the shared supervisory server 122 account information/payment information and (viii) manage the group member forum and general information exchange e.g. watch out for suspicious black sedan in area.

E. Normal Usage

When the private security system 101 is disarmed, humans may move around the outside (perimeter) of the physically secured building 130 and/or other restricted zone without engaging any sensory alerts. However, in the disarmed state, the detection devices 104 may still communicate periodically with the master device/shared supervisory server 120/122, providing status reports to maintain system integrity. Should the system integrity be compromised (e.g., tampering, low power level etc.), the administrator/administrators may be notified.

When the private security system 101 is armed, which can be armed manually (through the personal mobile device application 313) or automatically (personal mobile device 111 GPS co-ordinates moving away or self-learning), a delay period may be applied to allow for a vehicle and/or person to vacate. Once the private security system 101 is in the armed state, the detection devices 104 monitor the restricted area for human movement providing a curtain of security around the perimeter of the property.

Disarming the private security system 101 can be done manually, via a personal mobile device application 313, or automatically by knowing when a family group member has arrived (personal mobile device 111 GPS co-ordinates) or through learnt movement patterns.

As a private security system 101 can be armed while family group members are inside the physically secured building 130 and/or other type of restricted zone, the private security system 101 may disarm when other family group members arrive home (personal mobile device 111 GPS co-ordinates). This can occur automatically for a pre-determined time allowing the arriving family member access to the physically secured building 130 and/or other type of restricted zone before automatically returning to the previously armed state.

F. System Breach

Figure 7:
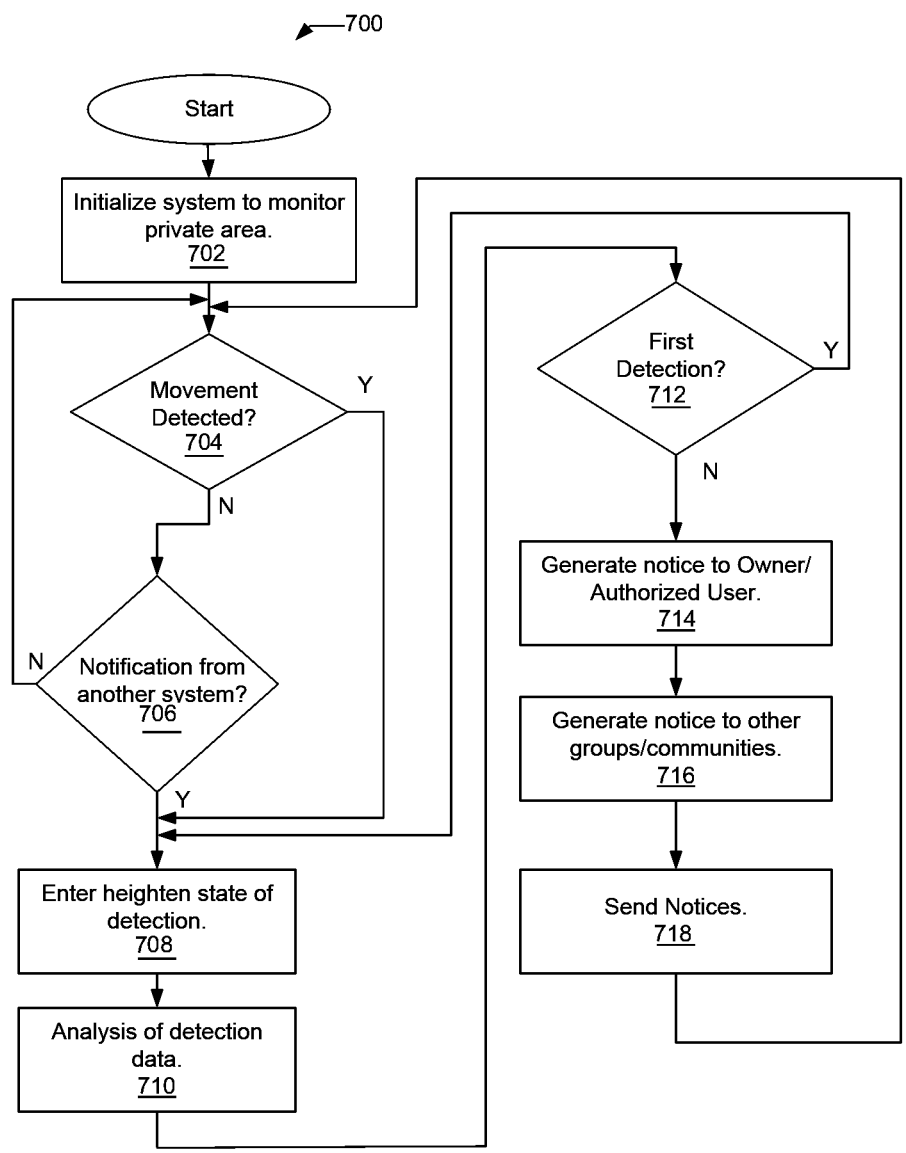
FIG. 7 depicts one example of an implementation of a flow diagram for the system handling of an approaching intruder detected by the security system.
Figure 8:
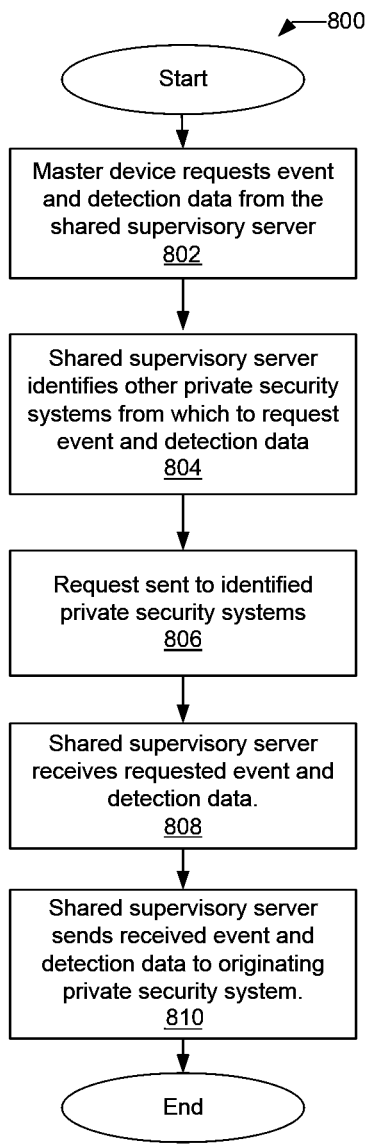
FIG. 8 depicts one example of an implementation of a flow diagram for the sharing of detection information.

FIG. 7 is a flow diagram outlining one example response of the system of the present invention when an intruder approaches. FIG. 8 illustrates a very basic example of one response from a private security system 101 that detects intruders in private security areas 102 and notifies users.

The intruder detection starts when the private security system 101 is initialized by being set to a ready state 702. This status is generally managed by the shared supervisory server 122 but could be duplicated with the master device 120 to provide autonomous operation. Once initialized, the detection device(s) 104 is/are in a ready state and the sensory alerts 309, 310 are placed in a standby state. If movement is detected in step 704, the private security system 101 enters a heightened state of operation in step 708, otherwise a check is made if a notification from another system, via the shared supervisory server 122 (in the current implementation) has been received in step 706. If no notification has been received in step 706, monitoring continues at step 704.

If the intruder detection system has entered a heightened state of detection in step 708, which may also be triggered by detection of further movement, an analysis of the detection data 710 is made at the supervisory server 122 or the master device 120 in step 712, additional detections may occur in step 704. Otherwise, multiple detections have occurred in step 712 and an intruder has been detected. A notice to the owner/authorized user is generated by the shared supervisory server 122 in step 714 and a notice to the other groups/communities is generated in step 716 by the shared supervisory server 122. The notices are sent in step 718 and monitoring continues. A watchdog timer is set when the first detection occurs in step 712 and reset with each additional detection occurrence. When the watchdog timer expires, the previous detection states are reset.

In summary, if the intruder approaches the property from the front, movement may be detected within a first detection zone. Visual sensory alert means (e.g. blue strobe light) may be activated as an initial deterrent, announcing to the intruder that they have been detected prior to entering the physically secured building 130 and/or other type of restricted zone. Alerting users may be reserved until the security system 101 detects continued movement around the physically secured building and/or other type of restricted zone to obtain covert access in, for example, a second detection zone.

The alert means may be escalated to an audible sensory alert means (e.g. siren, voice announcement etc.) and a visual sensory alert means (e.g. blue strobe light) located on one or all detection devices. The system administrator may be alerted of all actions. Communication of activity may be provided through personal mobile device applications 313.

Group members may also be notified through personal mobile device application 313 when certain activities occur that require broader notification. A satellite view of the private security area 102 may be provided on the user's personal mobile device 111, through the system application, to allow physical monitoring or to illustrate certain activity and the detected location of the activity in the private security area 102. The application 313, in communication with the shared supervisory server 122, can identify the closest user for response to an intrusion for investigation based upon current GPS geo-coordinate location monitored by the application 313 on personal mobile devices 111 of group members. The first or closest responder can report findings back to the other users also through the mobile application 313. All functions available via a mobile application 313 may also be made available to a user through via a website, with login account information.

If a breach is detected and an intruder 115 moves to an adjacent property or adjacent private security area 102, the detection on the second property can be immediately escalated. The community system 100 will be aware of the intruder detection and the absolute geo-coordinates of the detector 104 registering the movement so that bounding properties will be alerted in advance of movement detection that such detection should be immediately escalated. The system 100 can track the relationship between detections across the community system 100 into other private security areas 102 extending the curtain of security.

In a community system 100, as they are part of the official response group, a designated security authority such as a guardhouse can be presented with a satellite map/overview of the area covered by the curtain of security. When detection devices within this curtained area determine human movement 115, it can be plotted on a satellite map/street map/overview allowing the security authority to plot the intruder's 115 path through the curtained area. This allows the security authority to determine the whereabouts of the intruder 115 and possible path. This valuable information can be passed on to security patrols or relevant authorities such as police to aid in the apprehension of the intruder 115.

Response can be based upon members of the private security system 101 or based upon a community response group. Response groups may including groups categorized as follows: families, household members, geographic location, street group, official response group (gatehouse, community security, authorities, watch groups, work groups and/or social groups).

Community response may be based on a prioritized list or the geographic location (personal mobile device GPS co-ordinates). Any responder can use their personal mobile device application 313 to call a relevant authority such as the police if necessary. In a community or group response setting, the various system administrators/responders are kept appraised of all actions. Communication, including person-to-person communication with other group members, may be provided through a mobile application 313.

In FIG. 8, a flow diagram 800 of detection information being requested from other private security systems 101 via the master device 120 is depicted in accordance with an example implementation of the invention. FIG. 8 illustrates a very basic example of a system implementation that detects intruders in private security areas 102 and that not only notifies users but also communicates with other private security systems 101 in a community environment.

In FIG. 8, at step 802, the master device 120 of a security system 101 requests event and detection data from the shared supervisory server 122. The shared server 122, at step 804 identifies other relevant security systems 101. At step 806, the shared server 122 then communicates with other security systems 101 to gather information or retrieve stored information on the shared server 122 about the relevant security systems 101. Once the shared server 122 receives or retrieves relevant data 808, it is then able to communicate the information back to the security system 810. Information may be automatically pushed or retrieved upon request. Everything can be facilitated and managed via a shared server 122 or each security system 101 may interface with the shared server 122 via a master device 120.

G. Panic Feature

As noted above, the present invention relates to an emergency alert or panic feature that allows user to be availed to the resources of a nearby community security system 100 or private security system 101. The present invention allows group members or user in a private 101 or community security system 100 that find themselves feeling unsafe, injured, in duress or witness to an emergency, distress or potential dangerous situation whilst inside a physically secured building 130, private security area 102 or in the bounds of the community or another community to activate a panic feature from their personal mobile device application 313.

The panic feature, depending upon the situation, may activate all of the sensory alerts 309, 310 in a monitored or restricted area 102, along with those of adjacent properties, immediately escalating the situation, alerting others to the situation and deterring any person 115 responsible for creating the emergency situation from further engaging in the acts creating the situation. Audio, visual and recording features on the user's mobile device may also be engaged to transmit information about the emergency or panic situation to the nearby community security system 100 or private security system 101.

Depending on the response set-up, either/all of the geographic group, street group, official response group, etc. members may be notified of the panic situations initialized by members so that they are able to investigate and determine the correct response. Responders to a panic activation, may be selected dynamically at the time of the panic activation using such criteria as relative location of individual responders, even if the responders are not part of the same group or community as the person in panic.

As noted, this panic feature may also be activated in a community system 100 environment when a user is away from their private security area or restricted zone 102, for example, while walking, jogging etc. At the time of generating a panic, the user does not have to be a member of the community in which they find themselves. If the user feels threatened, is being followed, approached or in fear of abduction etc., the community group member could activate the personal mobile device application 313 panic feature.

The application 313 could be initiated activated by the user before leaving his or her private security area 102 or the application could be designed to run in the background at all times so that the user would not be required to turn the screen on or push a button to start the application 313, all depending upon programming and mobile device 111 operating system restrictions and/or controls.

The mobile device can enter panic mode by activation through a non-direct user action such as shaking the mobile device 111. As such, this panic feature could be engaged by shaking the personal mobile device 111 several times, or by a panic button or other short cut feature on the mobile device designated to engage the panic features. Optionally, in addition to or in conjunction with the above, the mobile device can enter panic mode by the performance of certain predetermined tactile functions by the user, such as repeatedly pressing of a key, button, or area of the touch screen when a certain application is operational. For example, activation may be triggered by repeated touch or holding down of both volume keys or establishing and reestablishing a connection with a certain area of the touch screen when the application is running.

As noted above, notification can be performed by dynamic selection, which would not require the user to provide email addresses, text messages etc. The decisions & notifications may be automatically determined by the supervisory server 122.

As the community group member is away from their own physically secured building 130 and/or private security area 102, but in close proximity of those of other community group members, and/or other community groups the personal mobile device application 313 panic feature may cause the sensory alerts 309, 310 at surrounding physically secured buildings 130 and/or private security areas 102 to be activated even if these systems are not in an armed state. This provides an immediate deterrent to the alleged perpetrator. Localized deterrent may also include audio generated from a user's mobile device 111, in addition to surrounding sensory alerts 309, 310.

The nearby community group members along with any relevant family group, geographic group, street group or official response group etc. members may be sent immediate notification through their personal mobile device application 313 informing them which community group member is in distress and their location allowing any nearby community group member to respond. Optionally, which group members are informed of these occurrences may be managed through the personal mobile device 111 GPS co-ordinates so that only those nearby are notified. The real-time GPS location of the user in panic may be presented in map form to the responders.

By notifying those closest to the user, assistance to the user in panic may be provided immediately by the local responders. Users are not required to wait for a predefined list of emergency contacts to respond. Further, the application 313 can allow responders to a panic situation to communicate with each other through the application 313 to coordinate the required response or call emergency services and police if required.

The distressed community group member's personal mobile device 111 GPS co-ordinates are constantly monitored until the panic has been manually cancelled on their personal mobile device application 313. Additionally, the microphone/camera of their personal mobile device 111 could be activated and the gathered audio/video information could be recorded locally or sent to the shared supervisory server 122 for storage and/or later retrieval for evidence purposes. Thus, on panic being activated the camera picture & microphone audio and real-time GPS tracking will all be gathered & transported to an offsite server 122 for recording. Playback of the recorded video/audio/GPS tracking from the offsite server 122 can be made available for later review (Police, FBI, authorised users, etc.).

While the primary purpose of the panic feature is personal safety within a community, those skilled in the art will recognize the application of this panic feature outside of one's own community. The benefits within the one's community or within similarly situated communities are undeniable.

Figure 9:
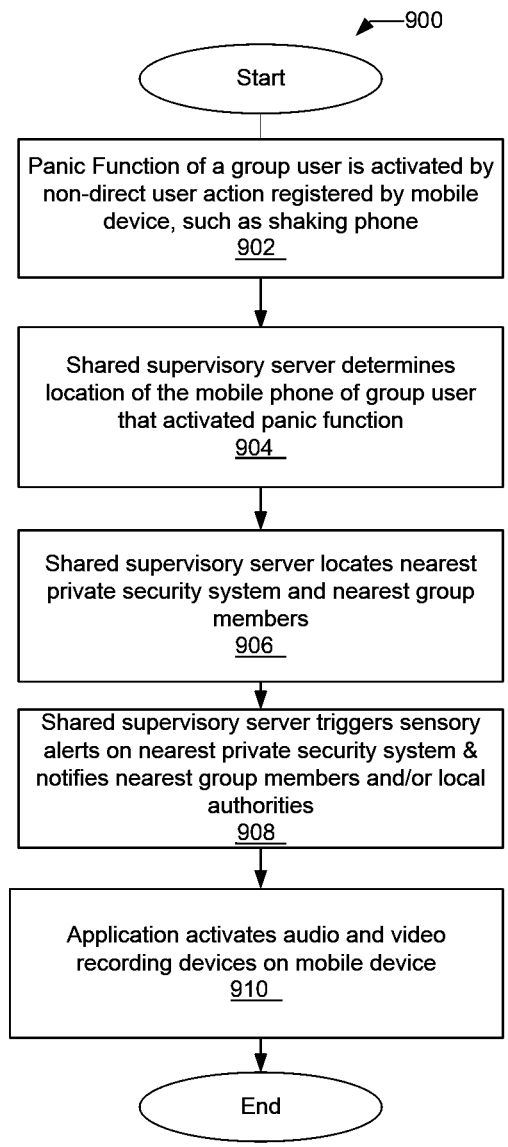
FIG. 9 depicts a flow diagram of one example of an implementation of a panic feature for use in connection with a community user's mobile device.

FIG. 9 depicts a flow diagram 900 of one example of an implementation of a panic feature for use in connection with a community user's mobile device. As illustrated in FIG. 9, the panic function on the personal mobile device application 313 of a group user is activated by non-direct or direct user action registered by mobile device 111, such as shaking the mobile device at step 902 or by hitting a panic button or engaging a short cut function. Once the panic function is activated, a notification is sent to the shared supervisory server 122 and the shared supervisory server 122 then determines the location of the mobile device 111 of the group user that activated panic function, at step 904. Once the location of the user is determined, at step 906, the shared supervisory server 122 locates the nearest private security system 101 and nearest group members to the user. The shared supervisory server 122 then triggers sensory alerts 309, 310 on nearest private security system & notifies nearest group members and/or local authorities of the user's location and panic situation, at step 908. Simultaneously, with activation of the panic function, the mobile device application 313 also activates the audio and video recording features on the mobile device 111 and, optionally, triggers sensor alerts on the mobile device 111, at step 910.

In summary, the user's mobile device 111 includes an application 313 that may be a stand-alone panic/emergency alert application or that is a community security application that includes a panic/emergency alert function. In either case, the application 131 facilitates communication, either directly or indirectly with a server, such as the supervisory server 122, that manages a community security system 100. The application 131 is able to trigger a panic/emergency alert by a predetermined user input, as explained above. Once triggered, the mobile device 111 will enter panic/emergency mode operation and may automatically perform a variety of operations, including but not limited to, determining the current location of the mobile device 111 and sending the current location of the mobile device 111 to the server 122. The application 131 can also automatically initiate the mobile device's 111 audio recording capabilities and the mobile device's 111 video recording capabilities and send the recordings to the server 122. The application 131 may further initiate an audible warning on the mobile device 111. Optionally, the mobile device 111 phone can also initiate contact with desired individuals, community members or private group members and/or emergency responders; however, this contact may also be managed by the community security system 100 alone or in conjunction with the mobile device 111.

It is further recognized that various methods may also be incorporated into the application 313 to deactivate a false trigger, by for example, giving the user the ability to take a certain action within a predetermined time period to deactivate the alert.

The supervisory server 122, when it receives input from a user's mobile device 111 that a panic alert has been initiated by the user of the mobile device 111, may then initiate a request to receive the location or general geo-location of the mobile device 111. Optionally, and more preferably, the mobile device 111 may automatically send its geo-location information to the server 122 when an alert is initiated. The supervisory server 122, once it receives such information, can then process the received data and perform a number of operations in response to the alert. Such response operations include, but are not limited to the following: (i) receiving and recording audio and visual data from the mobile device 111; (i) notifying potential responders, including group members and user, predetermined user emergency contacts, and/or emergency responders (i.e., fire, police, ambulance); (iii) determining the closest security system resources having sensory alerts 309, 310 to the mobile device 111 and remotely activating the sensory alerts 309, 310; and (iv) determining which camera(s) in the community security system (private or CCTV based cameras) are the closest to, or have the best view of, the area surrounding the mobile device 111, adjusting the camera(s) in the direction of the mobile device 111 and receive and record video from the camera(s) once adjusted in the direction of the mobile device 111; and (v) determining which members of the community security system 100 are closest to the user's mobile device 111 and notifying the members of the activation of an emergency alert and the location of the user's mobile device 111 that activated the alert.

By initiating, maintaining and/or monitoring communication with potential responders, the potential responders can assist the user, engage further emergency responders and/or provide relevant information to the community security system, other responders, group users and/or the emergency responders about the situation that triggered the alert. Such communication can be managed by the server 122 through text, email, voice chat or other established communication platforms and/or through the mobile device application 111 resident on responder's mobile devices or accessible through the web. All additional information received by the server 122 from the responders can then be managed by the supervisory server 122. Further necessary actions and/or responses based upon received data can then be initiated by the server 122.

For example, the community security system 100 can contact potential responders from any group in any system 100, including emergency responders. These responders may be alerted through their own mobile application 313 to the fact that someone has issued a panic situation in their immediate vicinity. The responder may indicate they are responding to the panic by accepting the "panic", through their own mobile application 313. Once the panic is accepted, the person in panic's distance and direction are overlayed onto a map, and the responder is added into a voice chat with any other responders. This information, together with a direction pointer are displayed onto the screen allowing the responder to locate the distressed person. This information is updated in real-time as the distressed person or responder changes location.

Received data may also be analyzed by the server 122 to better assess the gravity of situation and determine the type of response needed. For example, if the recorded video from the user's mobile device 111, security camera or CCTV camera shows smoke or a fire, the server 122 will know to immediately dispatch the fire department. Since a fire is detected as the emergency situation, the server 122 may not then trigger the activation of sensory alerts 309, 310 unless is deemed necessary as a mechanism to alert other community users of the situation. In that case, the sensory alerts 309, 310 would not act as deterrents but as notification alarms to community members.

Examples of the invention are discussed herein with reference to FIGS. 1-9; however, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the preceding embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features that are described in the context of separate embodiments may also be provided in combination in a single embodiment. Conversely, various features which are, for brevity, described in the context of a single embodiment, may also be provided separately or in any suitable sub-combination. The applicants hereby give notice that new claims may be formulated to such features and/or combinations of such features during the prosecution of the present Application or of any further application derived there from.

References to an "example," "implementation" or "embodiment" may indicate that the invention so described may include a particular feature, structure, or characteristic, but not every example, implementation or embodiment necessarily includes the particular feature, structure, or characteristic. Further, repeated use of the phrases "in one example," "in one implementation," or "in one embodiment," do not necessarily refer to the same example, implementation or embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer system" may refer to a system having one or more computers, where each computer may include computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and other non-transitory computer-readable storage mediums. These computer program products may provide software to a computer system. Embodiments of the invention may be directed to such computer program products.

An algorithm is generally considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In a similar manner, the term "processor" or "controller" may refer to any device or portion of a device that processes electronic data from registers and/or memory to transform that electronic data into other electronic data that may be stored in registers and/or memory. A "computing platform" may comprise one or more processors.

It will be understood, and is appreciated by persons skilled in the art, that one or more processes, sub-processes, or process steps described in connection with FIGS. 7, 8, 9 and 10 may be performed by hardware and/or software (machine readable instructions). If a server is described (master device may be implemented as a server), the term "server" may mean a combination of hardware and software operating together as a dedicated server or it may mean software executed on a server to implement the approach previously described. If the process is performed by software, the software may reside in software memory (not shown) in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a random access memory (RAM) (electronic), a read-only memory (ROM) (electronic), an erasable programmable read-only memory (EPROM or Flash memory) (electronic) and a portable compact disc read-only memory (CDROM) (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the intruder detection method and system has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

The invention claimed is:

1. A method for responding to a panic or emergency alert system by a community security system having users, the method comprising:
providing at least one server in network communication with multiple private security systems in a community, where the multiple private security systems include devices for detecting and monitoring intruder movement that are in communication with the at least one server such that the at least one server can remotely activate certain devices on each of the multiple private security systems in the community, and where each multiple private security system has authorized users having mobile devices in communication with the community security system and where the authorized users of the private security system are group members of the community security system;
a user's mobile device initiating a panic alert;
automatically notifying the at least one server of that a panic alert has been initiated by the user of the mobile device;
receiving at the at least one server the location of the mobile device;
the at least one server sending an alert message to group members that a user of a private security system within the community has initiated a panic alert;
the at least one server notifying emergency responders; and
receiving at the at least one server recorded audio and visual recordings from the mobile device.

2. The method of claim 1 where the detecting and monitoring devices of the community security system includes cameras and where the method further comprising determining a camera in the community security system that has a view of the area surrounding the mobile device and adjusting the camera in the direction of the mobile device and receiving and recording video from the camera once it is adjusted in the direction of the mobile device.

3. The method of claim 1 where the method further includes determining which members of the community security system are closest to the user's mobile device and notifying the members of the activation of an emergency alert and the location of the user's mobile device that activated the alert.

4. The method of claim 1 where the method further includes determining the closest security system resource having sensory alerts to the mobile device and remotely activating the sensory alerts of the closest security system.

5. The method of claim 1 where, when the panic alert is initiated by the user of the mobile device, the mobile device automatically initiates the mobile device's audio recording capabilities and the mobile device's video recording capabilities.

6. The method of claim 1 where the panic alert is initiated by the user of the mobile device by the user shaking the mobile device.

7. The method of claim 1 where the panic alert is initiated by the user of the mobile device by the recording of certain tactile functions performed by the user of the mobile device.

8. The method of claim 1 where the mobile device further automatically initiates an audible warning when a panic alert has been initiated by the user of the mobile device.

9. A method for responding to a panic or emergency alert system by a community security system having users, the method comprising:
providing at least one server in network communication with multiple private security systems in a community, where the multiple private security systems include devices for detecting and monitoring intruder movement that are in communication with the at least one server such that the at least one server can remotely activate certain devices on each of the multiple private security systems in the community, and where each multiple private security system has authorized users having mobile devices in communication with the community security system and where the authorized users of the private security system are group members of the community security system;
initiating a panic alert from a user's mobile device;
automatically notifying the at least one server of that a panic alert has been initiated by the user of the mobile device;
automatically notifying the at least one server that a panic alert has been initiated by the user of the mobile device;
receiving at the at least one server the location of the mobile device;
the at the at least one server sending an alert message to group members;
the at the at least one server notifying emergency responders;
receiving at the at least one server recorded audio and visual recordings from the mobile device;
the at least one server determining the closest private security system device to the user's mobile device that initiated the panic alert that has a sensory alert; and
the at least one server remotely activating the sensory alerts of the closest private security system; and
the at least one server identifying the closest group members to the user's mobile device that initiated the panic alert and notifying such group members of the user's initiation of the panic alert.

10. The method of claim 9 where at least some of the private security systems of the community security system includes cameras and where the method further comprises determining a camera in the community security system that has a view of the area surrounding the user's mobile device that initiated the panic alert and adjusting the camera in the direction of the mobile device.

11. The method of claim 10 further comprising receiving and recording video from the camera once it is adjusted in the direction of the mobile device.

12. The method of claim 10 where more than one camera is located and adjusted in the direction of the mobile device.

13. The method of claim 9 where the method further includes notifying the group members closest to the user's mobile device that initiated the panic alert of the location of the user's mobile device that activated the alert.

* * * * *